United States Patent
Konduru

(10) Patent No.: US 10,355,864 B2
(45) Date of Patent: Jul. 16, 2019

(54) POLICY BASED AUTHENTICATION

(71) Applicant: Citrix Systems, Inc., Fort Lauderdale, FL (US)

(72) Inventor: Pranav Kumar Konduru, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 45 days.

(21) Appl. No.: 15/689,568

(22) Filed: Aug. 29, 2017

(65) Prior Publication Data

US 2019/0068373 A1    Feb. 28, 2019

(51) Int. Cl.
| | |
|---|---|
| *H04L 9/32* | (2006.01) |
| *H04L 29/06* | (2006.01) |
| *G06F 21/44* | (2013.01) |
| *G06F 21/33* | (2013.01) |
| *G06F 21/34* | (2013.01) |

(52) U.S. Cl.
CPC .......... *H04L 9/3213* (2013.01); *G06F 21/335* (2013.01); *G06F 21/44* (2013.01); *H04L 63/0853* (2013.01); *G06F 21/34* (2013.01); *H04L 63/0823* (2013.01)

(58) Field of Classification Search
CPC ............... H04L 9/3213; H04L 63/0853; H04L 63/0823; G06F 21/44; G06F 21/335; G06F 21/34

See application file for complete search history.

(56) References Cited

U.S. PATENT DOCUMENTS

| | | | | | |
|---|---|---|---|---|---|
| 7,636,936 | B2* | 12/2009 | Wright | ................... | G06F 21/32 379/15.03 |
| 8,707,409 | B2* | 4/2014 | Shah | ....................... | G06F 21/41 726/8 |
| 2011/0106708 | A1* | 5/2011 | Herwig | ................. | G06Q 10/10 705/50 |
| 2013/0139241 | A1* | 5/2013 | Leeder | .................. | H04W 12/06 726/9 |
| 2014/0013396 | A1* | 1/2014 | Field-Eliot | .......... | H04L 63/0807 726/4 |
| 2014/0189781 | A1* | 7/2014 | Manickam | .............. | H04L 67/34 726/1 |
| 2015/0188909 | A1* | 7/2015 | Hyland | ............... | H04L 63/0861 726/4 |

(Continued)

*Primary Examiner* — Matthew Smithers
(74) *Attorney, Agent, or Firm* — Banner & Witcoff, Ltd.

(57) ABSTRACT

Methods and systems for expedited authentication for mobile applications are described herein. A user of a mobile device may authenticate with an enterprise system, and thereby be granted access to enterprise applications and services on the mobile device. The user may then activate an application in a managed partition of the mobile device. The application may determine that the enterprise system supports expedited authentication. The application may request expedited authentication, and the request may be compared to policies for expedited authentication. If the request is permitted, the application may be granted access to an authorization code for expedited authentication. The application may then perform the expedited authentication, and the user may be granted access to the application when the expedited authentication has completed.

17 Claims, 13 Drawing Sheets

(56) References Cited

U.S. PATENT DOCUMENTS

| | | | | |
|---|---|---|---|---|
| 2015/0319174 | A1* | 11/2015 | Hayton | H04L 63/10 |
| | | | | 726/7 |
| 2016/0050193 | A1* | 2/2016 | Kanov | H04W 12/06 |
| | | | | 726/7 |
| 2016/0164851 | A1* | 6/2016 | Borovoy | G06F 21/44 |
| | | | | 726/1 |
| 2017/0019402 | A1* | 1/2017 | Kulkarni | H04L 63/0807 |
| 2017/0163635 | A1* | 6/2017 | Hirata | H04L 63/083 |
| 2017/0257360 | A1* | 9/2017 | Gattu | H04L 63/0823 |
| 2017/0372055 | A1* | 12/2017 | Robinson | H04W 12/06 |
| 2018/0324172 | A1* | 11/2018 | Unnikrishnan | H04L 63/0815 |

* cited by examiner

POLICY BASED AUTHENTICATION

FIELD

Aspects described herein generally relate to computers, networking, hardware, and software. More specifically, one or more aspects of the disclosure relate to providing authentication for applications, and using policies to manage the authentication.

BACKGROUND

Applications, such as mobile device applications, may request that a user authenticate with the application when the application is initiated or during use of the application. For example, a user may enter a username and password to authenticate with the application. Once the user has authenticated with the application, the user may access the application, or various features of the application that are only accessible after authentication. Authentication may be cumbersome for a user, because the user must remember and input the username and password. Further, the user may wish to access multiple applications, and it may be cumbersome for the user to enter authentication details for each application.

An entity associated with a user, such as an enterprise that employs the user, may wish to impose various restrictions on access to one or more applications. The applications may be installed on a mobile device. Placing restrictions on a mobile device can be complex, particularly if the mobile device is owned by the user and not the entity.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for providing authentication for applications.

In particular, one or more aspects of the disclosure provides ways of permitting an application to perform an expedited authentication with an enterprise system, when a user has previously authenticated with the enterprise system. Once authenticated, the application may be able to access data corresponding to the user. For example, by implementing one or more aspects of the disclosure, an application installed in a managed partition of a mobile device may authenticate with an enterprise authentication server. The user may authorize the application to authenticate, without entering additional authentication credentials. Various policies may be implemented to control whether or not the application will be permitted to authenticate.

In some embodiments, authentication credentials may be received for a client agent. The authentication credentials may correspond to a user. An authentication request may be transmitted based on the authentication credentials. In response to the authentication request, one or more rules for expedited authentication may be received. A request may be received to activate a mobile device application. In response to determining that an expedited authentication application programming interface (API) is available at the client agent, a selectable element may be displayed. The selectable element may correspond to expedited authentication. A request for expedited authentication may be received via the selectable element. One or more rules may be used to determine to provide expedited authentication to the mobile device application. An authorization code may be received and exchanged for an access token. The user may be authorized, based on the access token, to access the mobile device application.

A current time may be compared to permitted times, in the one more rules, for accessing the application. A current location of the user may be compared to permitted locations, in the one or more rules, for accessing the application. The mobile device application may be a managed application executing within a secure partition of a mobile device. The mobile device application may be configured to access data within the secure partition of the mobile device. The client agent may provide the mobile device application access to the secure partition. The rules may indicate one or more time periods in which the user is permitted to access the mobile device application. The rules may indicate one or more geographic areas in which the user is permitted to access the mobile device application. The mobile device application may be downloaded via the client agent. The client agent may comprise the expedited authentication API. The application may communicate with the client agent via the expedited authentication API.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a system for expedited authentication. A user may authenticate with a client agent, which may be associated with an enterprise. For example, a user may login to an enterprise portal on a mobile device. The user may then initiate an application, and the application may request that the user authenticate with the application, such as by logging in to the application. The application may provide the user the option of entering a username and password, or performing an expedited authentication. When the user selects the expedited authentication, the client agent may permit or deny the request for expedited authentication based on policies. If the request is permitted, the application may be provided an authorization code, and the user may then be authenticated with the application using the enterprise authentication.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
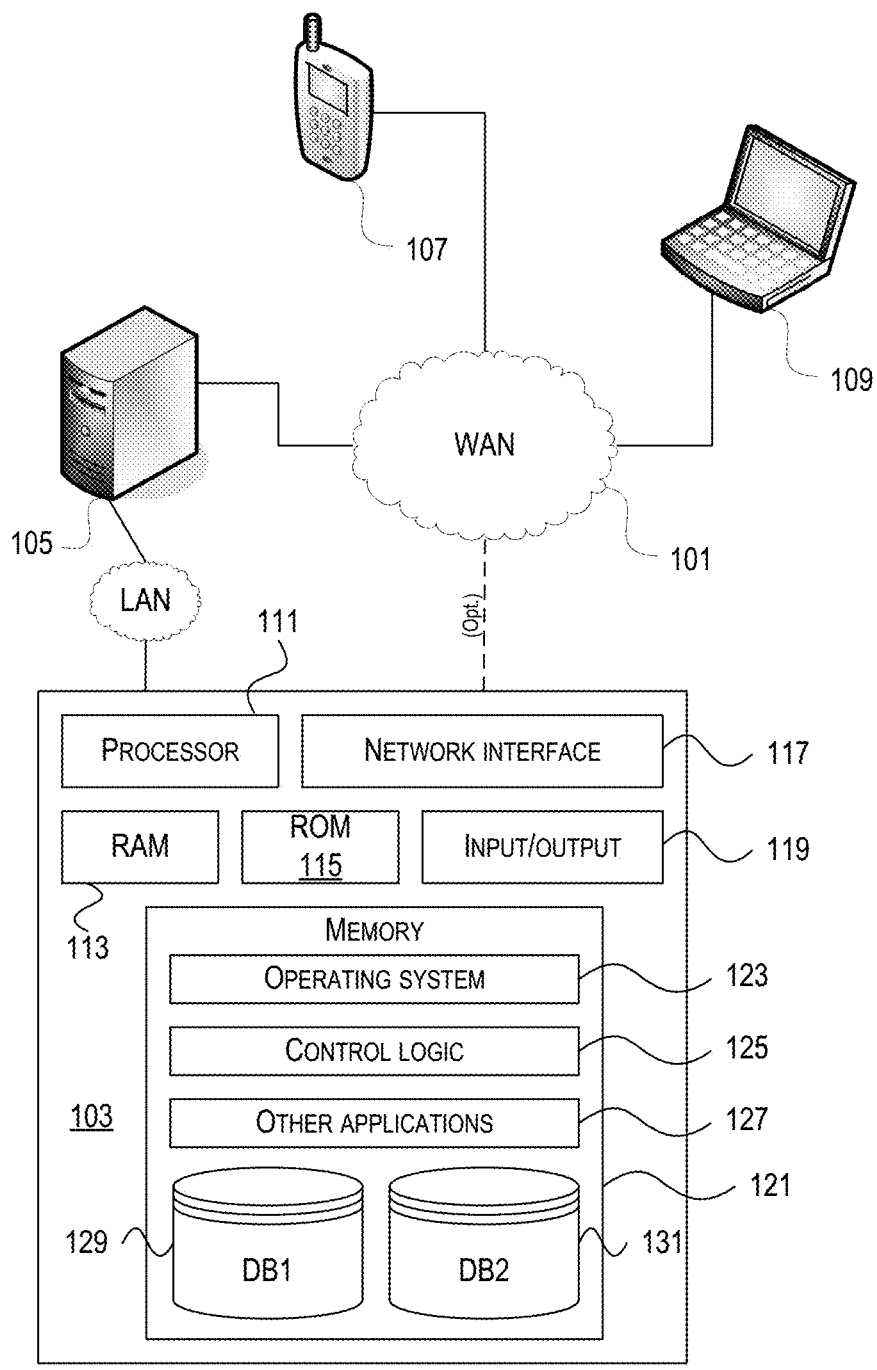
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
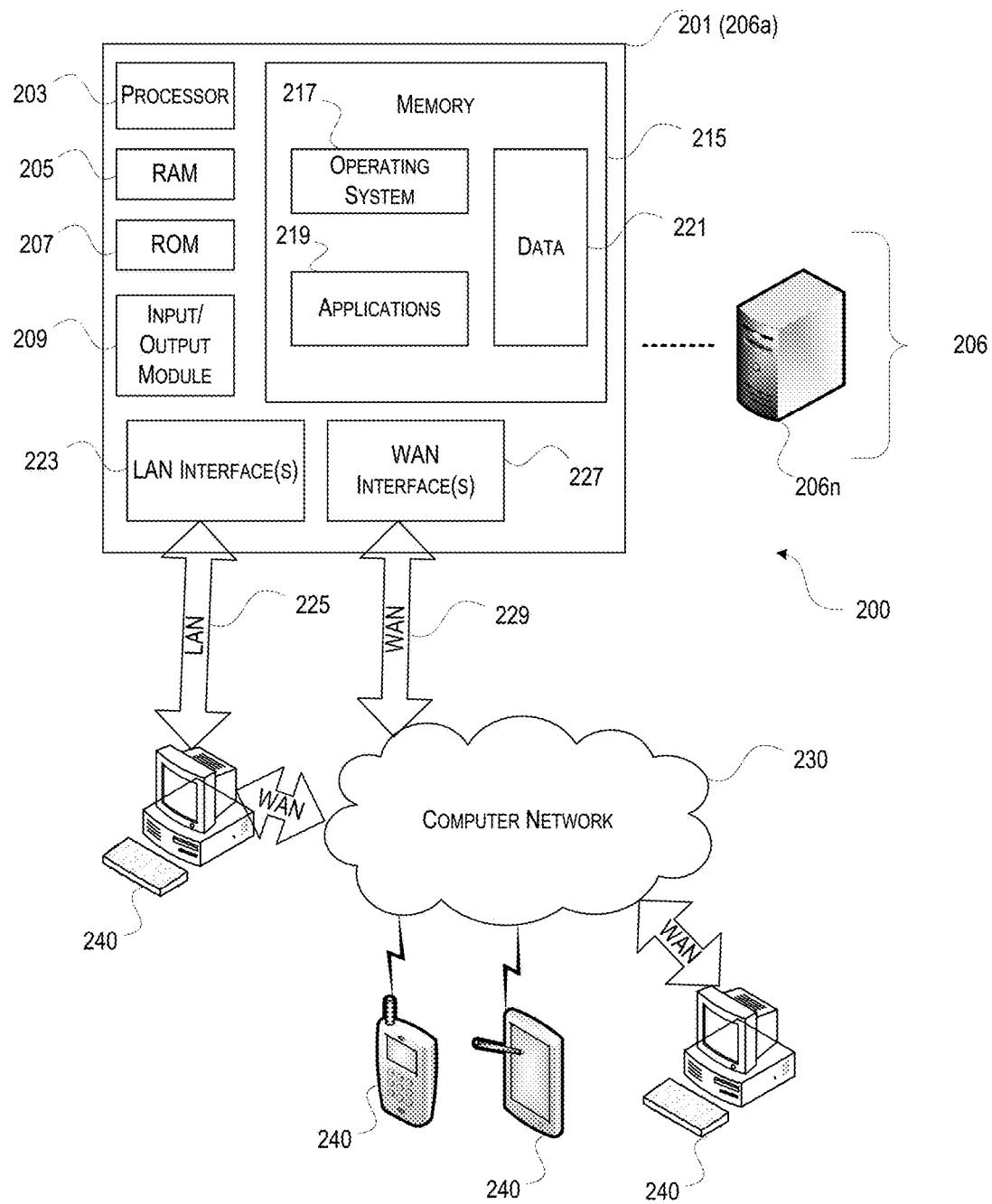
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown). First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
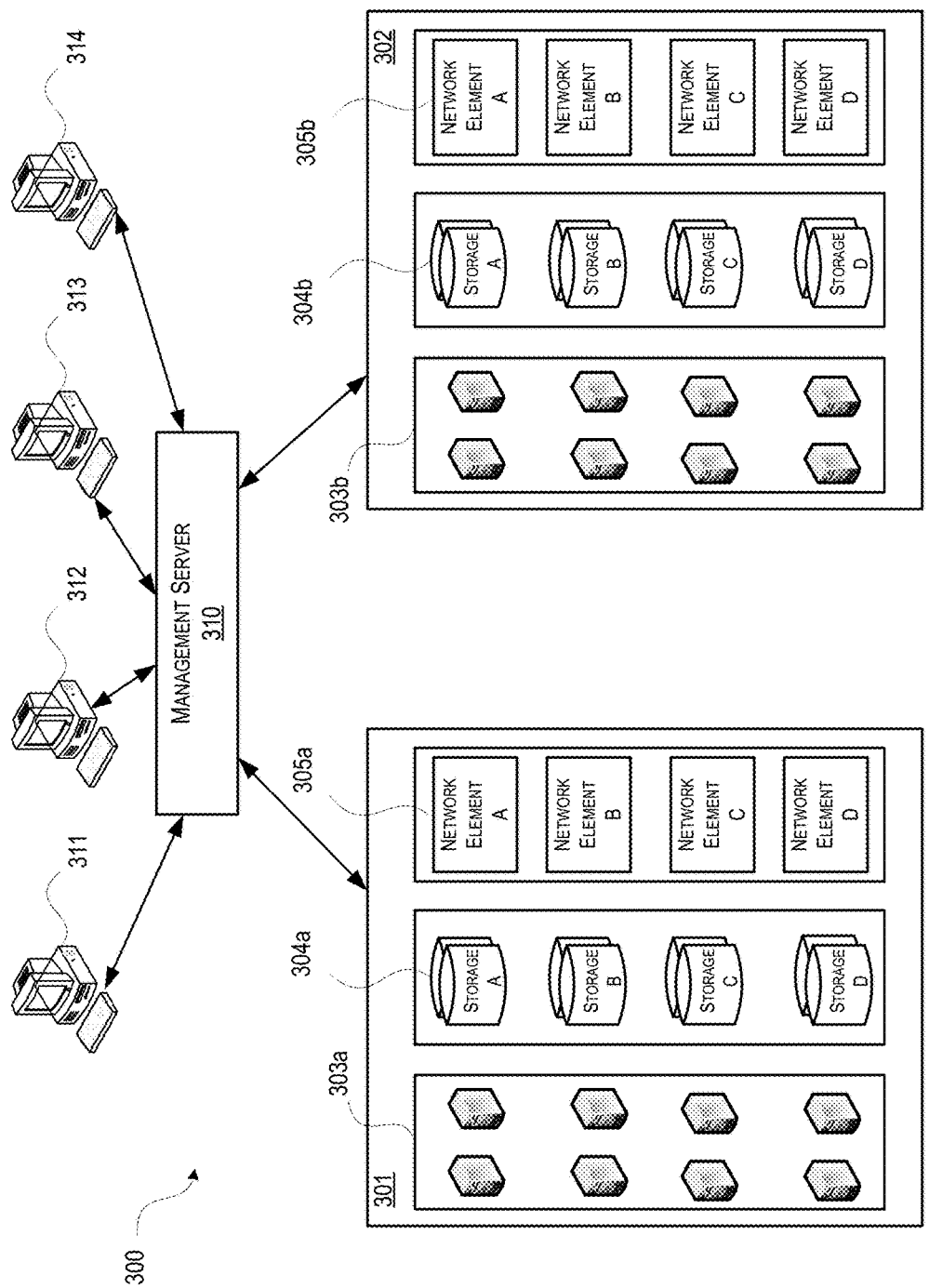
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303a-303b (generally referred herein as "host servers 303"), storage resources 304a-304b (generally referred herein as "storage resources 304"), and network resources 305a-305b (generally referred herein as "network resources 305")) of the cloud system.

Management server 310 may be implemented on one or more physical servers. The management server 310 may run, for example, CLOUDPLATFORM by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over open or hybrid networks.

Management server 310 may be configured to provide user interfaces through which cloud operators and cloud customers may interact with the cloud system 300. For example, the management server 310 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or some other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management server 310 may be located at one of the availability zones, or at a separate location. Each zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, each zone 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical hosting resources in a cloud zone 301-302 may include one or more computer servers 303, such as the virtualization servers 301 described above, which may be configured to create and host virtual machine instances. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

The example cloud computing environment shown in FIG. 3 also may include a virtualization layer with additional hardware and/or software resources configured to create and manage virtual machines and provide other services to customers using the physical resources in the cloud. The virtualization layer may include hypervisors, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 303 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 4:
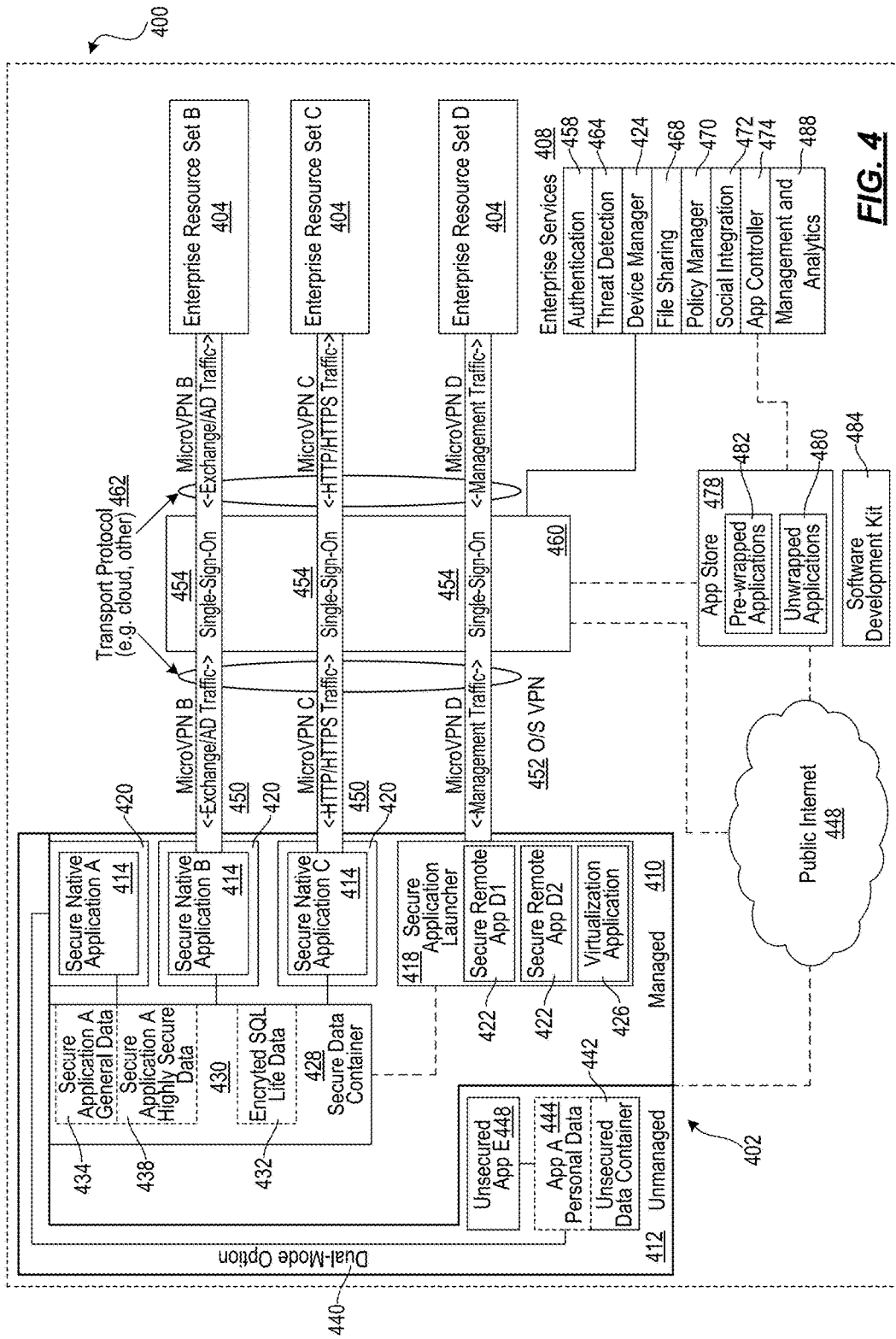
FIG. 4 depicts an illustrative enterprise mobility management system that may be used in accordance with one or more illustrative aspects described herein.

FIG. 4 represents an enterprise mobility technical architecture 400 for use in a "Bring Your Own Device" (BYOD) environment. The architecture enables a user of a mobile device 402 to both access enterprise or personal resources from a mobile device 402 and use the mobile device 402 for personal use. The user may access such enterprise resources 404 or enterprise services 408 using a mobile device 402 that is purchased by the user or a mobile device 402 that is provided by the enterprise to the user. The user may utilize the mobile device 402 for business use only or for business and personal use. The mobile device 402 may run an iOS operating system, an Android operating system, or the like. The enterprise may choose to implement policies to manage the mobile device 402. The policies may be implemented through a firewall or gateway in such a way that the mobile device 402 may be identified, secured or security verified, and provided selective or full access to the enterprise resources (e.g., 404 and 408). The policies may be mobile device management policies, mobile application management policies, mobile data management policies, or some combination of mobile device, application, and data management policies. As described below in regards to FIGS. 6A-14, the policies may comprise policies for expedited authentication. A mobile device 402 that is managed through the application of mobile device management policies may be referred to as an enrolled device.

In some embodiments, the operating system of the mobile device 402 may be separated into a managed partition 410 and an unmanaged partition 412. The managed partition 410 may have policies applied to it to secure the applications running on and data stored in the managed partition 410. The applications running on the managed partition 410 may be secure applications. All or a portion of the secure applications may be authenticated, for example with the enterprise, using expedited authentication, which is further described below. In other embodiments, all applications may execute in accordance with a set of one or more policy files received separate from the application, and which define one or more security parameters, features, resource restrictions, and/or other access controls that are enforced by the mobile device management system when that application is executing on the mobile device 402. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is impenetrable by unmanaged applications and devices.

The secure applications may be email applications, web browsing applications, software-as-a-service (SaaS) access applications, Windows Application access applications, and the like. The secure applications may be secure native applications 414, secure remote applications 422 executed by a secure application launcher 418, virtualization applications 426 executed by a secure application launcher 418, and the like. The secure native applications 414 may be wrapped by a secure application wrapper 420. The secure application wrapper 420 may include integrated policies that are executed on the mobile device 402 when the secure native application 414 is executed on the mobile device 402. The secure application wrapper 420 may include meta-data that points the secure native application 414 running on the mobile device 402 to the resources hosted at the enterprise (e.g., 404 and 408) that the secure native application 414 may require to complete the task requested upon execution of the secure native application 414. The secure applications may be to interact with an API for expedited authentication. The secure remote applications 422 executed by a secure application launcher 418 may be executed within the secure application launcher 418. The virtualization applications 426 executed by a secure application launcher 418 may utilize resources on the mobile device 402, at the enterprise resources 404, and the like. The resources used on the mobile device 402 by the virtualization applications 426 executed by a secure application launcher 418 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 404, and the like. The resources used at the enterprise resources 404 by the virtualization applications 426 executed by a secure application launcher 418 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 426 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 402, this arrangement may also be elected for certain applications. For example, while some applications may be secured for use on the mobile device 402, others might not be prepared or appropriate for deployment on the mobile device 402 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 402 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 402 as well as a virtualization application 426 to allow access to applications that are deemed more properly operated on the server side. In an embodiment, the virtualization application 426 may store some data, files, etc. on the mobile device 402 in one of the secure storage locations. An enterprise, for example, may elect to allow certain information to be stored on the mobile device 402 while not permitting other information.

In connection with the virtualization application 426, as described herein, the mobile device 402 may have a virtualization application 426 that is designed to present GUIs and then record user interactions with the GUI. The virtualization application 426 may communicate the user interactions to the server side to be used by the server side application as user interactions with the application. In response, the application on the server side may transmit back to the mobile device 402 a new GUI. For example, the new GUI may be a static page, a dynamic page, an animation, or the like, thereby providing access to remotely located resources.

The secure applications 414 may access data stored in a secure data container 428 in the managed partition 410 of the mobile device 402. The data secured in the secure data container may be accessed by the secure native applications 414, secure remote applications 422 executed by a secure application launcher 418, virtualization applications 426 executed by a secure application launcher 418, and the like. The data stored in the secure data container 428 may include files, databases, and the like. The data stored in the secure data container 428 may include data restricted to a specific secure application 430, shared among secure applications 432, and the like. Data restricted to a secure application may include secure general data 434 and highly secure data 438. Secure general data may use a strong form of encryption such as Advanced Encryption Standard (AES) 128-bit encryption or the like, while highly secure data 438 may use a very strong form of encryption such as AES 256-bit encryption. Data stored in the secure data container 428 may be deleted from the mobile device 402 upon receipt of a command from the device manager 424. The secure applications (e.g., 414, 422, and 426) may have a dual-mode option 440. The dual mode option 440 may present the user with an option to operate the secured application in an unsecured or unmanaged mode. In an unsecured or unmanaged mode, the secure applications may access data stored in an unsecured data container 442 on the unmanaged partition 412 of the mobile device 402. The data stored in an unsecured data container may be personal data 444. The data stored in an unsecured data container 442 may also be accessed by unsecured applications 446 that are running on the unmanaged partition 412 of the mobile device 402. The data stored in an unsecured data container 442 may remain on the mobile device 402 when the data stored in the secure data container 428 is deleted from the mobile device 402. An enterprise may want to delete from the mobile device 402 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 402 may connect to enterprise resources 404 and enterprise services 408 at an enterprise, to the public Internet 448, and the like. The mobile device 402 may connect to enterprise resources 404 and enterprise services 408 through virtual private network connections. The virtual private network connections, also referred to as microVPN or application-specific VPN, may be specific to particular applications 450, particular devices, particular secured areas on the mobile device 452, and the like. For example, each of the wrapped applications in the secured area of the mobile device 402 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 454. The single-sign-on processes may allow a user to provide a single set of authentication credentials, which are then verified by an authentication service 458. The authentication service 458 may then grant to the user access to multiple enterprise resources 404, without requiring the user to provide authentication credentials to each individual enterprise resource 404.

The virtual private network connections may be established and managed by an access gateway 460. The access gateway 460 may include performance enhancement features that manage, accelerate, and improve the delivery of enterprise resources 404 to the mobile device 402. The access gateway 460 may also re-route traffic from the mobile device 402 to the public Internet 448, enabling the mobile device 402 to access publicly available and unsecured applications that run on the public Internet 448. The mobile device 402 may connect to the access gateway via a transport network 462. The transport network 462 may be a wired network, wireless network, cloud network, local area network, metropolitan area network, wide area network, public network, private network, and the like.

The enterprise resources 404 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 404 may be premise-based resources, cloud-based resources, and the like. The enterprise resources 404 may be accessed by the mobile device 402 directly or through the access gateway 460. The enterprise resources 404 may be accessed by the mobile device 402 via the transport network 462.

The enterprise services 408 may include authentication services 458, threat detection services 464, device manager services 424, file sharing services 468, policy manager services 470, social integration services 472, application controller services 474, and the like. Authentication services 458 may include user authentication services, device authentication services, application authentication services, data authentication services, and the like. Authentication services 458 may use certificates. The certificates may be stored on the mobile device 402, by the enterprise resources 404, and the like. The certificates stored on the mobile device 402 may be stored in an encrypted location on the mobile device 402, the certificate may be temporarily stored on the mobile device 402 for use at the time of authentication, and the like. Threat detection services 464 may include intrusion detection services, unauthorized access attempt detection services, and the like. Unauthorized access attempt detection services may include unauthorized attempts to access devices, applications, data, and the like. Device management services 424 may include configuration, provisioning, security, support, monitoring, reporting, and decommissioning services. File sharing services 468 may include file management services, file storage services, file collaboration services, and the like. Policy manager services 470 may include device policy manager services, application policy manager services, data policy manager services, and the like. Social integration services 472 may include contact integration services, collaboration services, integration with social networks such as Facebook, Twitter, and LinkedIn, and the like. Application controller services 474 may include management services, provisioning services, deployment services, assignment services, revocation services, wrapping services, and the like.

The enterprise mobility technical architecture 400 may include an application store 478. The application store 478 may include unwrapped applications 480, pre-wrapped applications 482, and the like. Applications may be populated in the application store 478 from the application controller 474. The application store 478 may be accessed by the mobile device 402 through the access gateway 460, through the public Internet 448, or the like. The application store 478 may be provided with an intuitive and easy to use user interface.

A software development kit 484 may provide a user the capability to secure applications selected by the user by wrapping the application as described previously in this description. An application that has been wrapped using the software development kit 484 may then be made available to the mobile device 402 by populating it in the application store 478 using the application controller 474.

The enterprise mobility technical architecture 400 may include a management and analytics capability 488. The management and analytics capability 488 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 5:
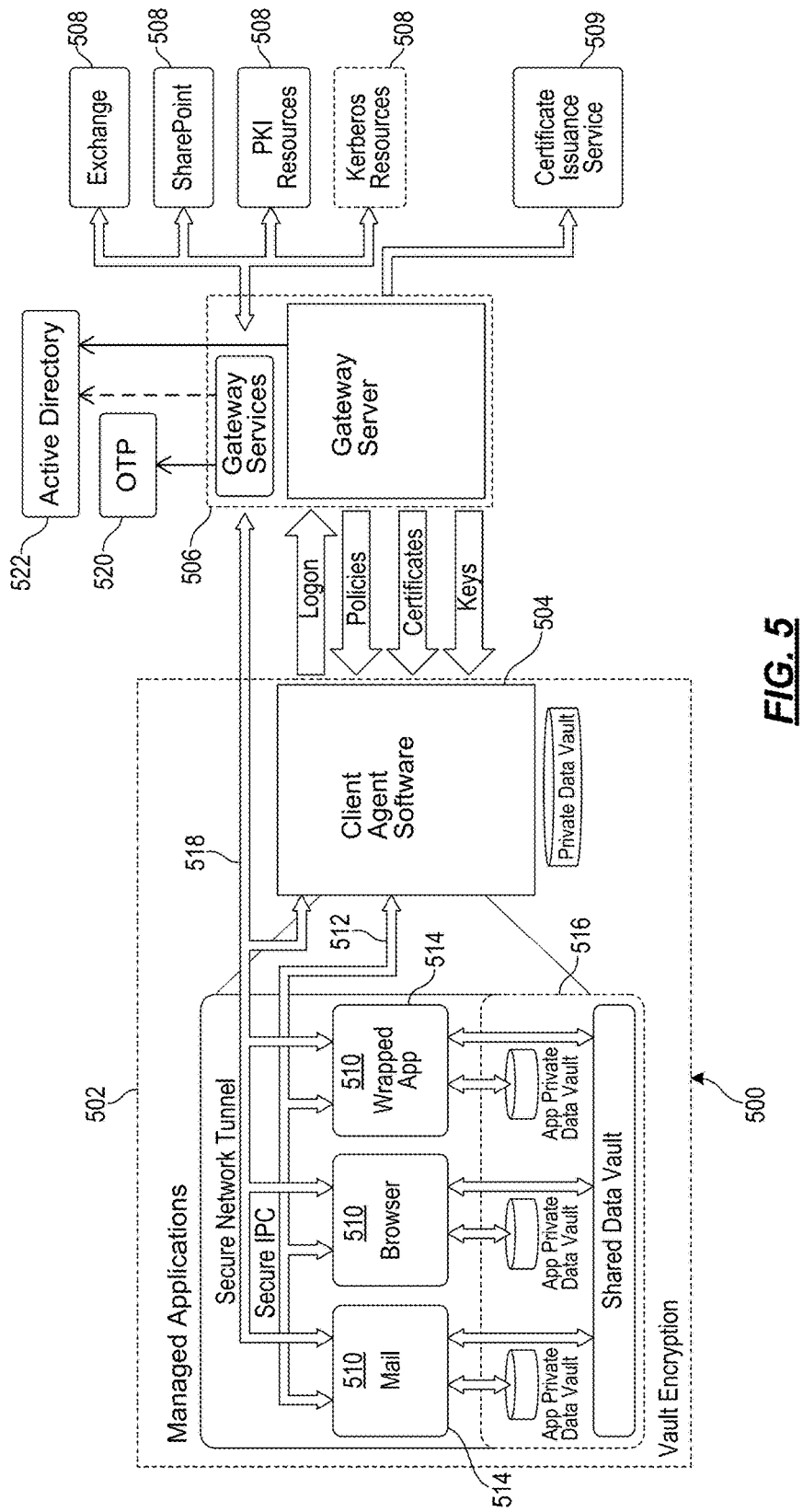
FIG. 5 depicts another illustrative enterprise mobility management system that may be used in accordance with one or more illustrative aspects described herein.

FIG. 5 is another illustrative enterprise mobility management system 500. Some of the components of the mobility management system 400 described above with reference to FIG. 4 have been omitted for the sake of simplicity. The architecture of the system 500 depicted in FIG. 5 is similar in many respects to the architecture of the system 400 described above with reference to FIG. 4 and may include additional features not mentioned above.

In this case, the left hand side represents an enrolled mobile device 502 with a client agent 504, which interacts with gateway server 506 (which includes Access Gateway and application controller functionality) to access various enterprise resources 508 and services 509 such as Exchange, Sharepoint, public-key infrastructure (PKI) Resources, Kerberos Resources, Certificate Issuance service, as shown on the right hand side above. Although not specifically shown, the mobile device 502 may also interact with an enterprise application store (StoreFront) for the selection and downloading of applications.

The client agent 504 acts as the UI (user interface) intermediary for Windows apps/desktops hosted in an Enterprise data center, which are accessed using the High-Definition User Experience (HDX)/ICA display remoting protocol. The client agent 504 also supports the installation and management of native applications on the mobile device 502, such as native iOS or Android applications. For example, the managed applications 510 (mail, browser, wrapped application) shown in the figure above are all native applications that execute locally on the mobile device 502. Client agent 504 and application management framework of this architecture act to provide policy driven management capabilities and features such as connectivity and SSO (single sign on) to enterprise resources/services 508. As described further below in regards to FIGS. 6A-14, the client agent 504 may provide SSO, or expedited authentication, for one or more applications on the mobile device 502. The client agent 504 handles primary user authentication to the enterprise, normally to Access Gateway (AG) 506 with SSO to other gateway server components. The client agent 504 obtains policies from gateway server 506 to control the behavior of the managed applications 510 on the mobile device 502.

The Secure InterProcess Communication (IPC) links 512 between the native applications 510 and client agent 504 represent a management channel, which may allow a client agent to supply policies to be enforced by the application management framework 514 "wrapping" each application. The IPC channel 512 may also allow client agent 504 to supply credential and authentication information that enables connectivity and SSO to enterprise resources 508. Finally, the IPC channel 512 may allow the application management framework 514 to invoke user interface functions implemented by client agent 504, such as online and offline authentication.

Communications between the client agent 504 and gateway server 506 are essentially an extension of the management channel from the application management framework 514 wrapping each native managed application 510. The application management framework 514 may request policy information from client agent 504, which in turn may request it from gateway server 506. The application management framework 514 may request authentication, and client agent 504 may log into the gateway services part of gateway server 506 (also known as NETSCALER ACCESS GATEWAY). Client agent 504 may also call supporting services on gateway server 506, which may produce input material to derive encryption keys for the local data vaults 516, or may provide client certificates which may enable direct authentication to PKI protected resources, as more fully explained below.

In more detail, the application management framework 514 "wraps" each managed application 510. This may be incorporated via an explicit build step, or via a post-build processing step. The application management framework 514 may "pair" with client agent 504 on first launch of an application 510 to initialize the Secure IPC channel 512 and obtain the policy for that application. The application management framework 514 may enforce relevant portions of the policy that apply locally, such as the client agent login dependencies and some of the containment policies that restrict how local OS services may be used, or how they may interact with the managed application 510.

The application management framework 514 may use services provided by client agent 504 over the Secure IPC channel 512 to facilitate authentication and internal network access. Key management for the private and shared data vaults 516 (containers) may be also managed by appropriate interactions between the managed applications 510 and client agent 504. Vaults 516 may be available only after online authentication, or may be made available after offline authentication if allowed by policy. First use of vaults 516 may require online authentication, and offline access may be limited to at most the policy refresh period before online authentication is again required.

Network access to internal resources may occur directly from individual managed applications 510 through Access Gateway 506. The application management framework 514 may be responsible for orchestrating the network access on behalf of each managed application 510. Client agent 504 may facilitate these network connections by providing suitable time limited secondary credentials obtained following online authentication. Multiple modes of network connection may be used, such as reverse web proxy connections and end-to-end VPN-style tunnels 518.

The Mail and Browser managed applications 510 have special status and may make use of facilities that might not be generally available to arbitrary wrapped applications. For example, the Mail application 510 may use a special background network access mechanism that allows it to access an Exchange server 508 over an extended period of time without requiring a full AG logon. The Browser application 510 may use multiple private data vaults 516 to segregate different kinds of data.

This architecture may support the incorporation of various other security features. For example, gateway server 506 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 506 may identify managed native applications 510 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 516 (containers) on the mobile device 502. The vaults 516 may be encrypted so that all on-device data including files, databases, and configurations are protected. For on-line vaults, the keys may be stored on the server (gateway server 506), and for off-line vaults, a local copy of the keys may be protected by a user password or biometric validation. If or when data is stored locally on the mobile device 502 in the secure container 516, it may be preferred that a minimum of AES 256 encryption algorithm be utilized.

Other secure container features may also be implemented. For example, a logging feature may be included, wherein security events happening inside a managed application 510 may be logged and reported to the backend. Data wiping may be supported, such as if or when the managed application 510 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 502 is generated using a passphrase or biometric data supplied by the user (if offline access is required). It may be XORed with another key randomly generated and stored on the server side if offline access is not required. Key derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 514 may be prevented in other ways. For example, if or when a managed application 510 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 520 without the use of an AD (active directory) 522 password for access to one or more applications. In some cases, some users do not know (or are not permitted to know) their AD password, so these users may authenticate using an OTP 520 such as by using a hardware OTP system like SecurID (OTPs may be provided by different vendors also, such as Entrust or Gemalto). In some cases, after a user authenticates with a user ID, a text may be sent to the user with an OTP 520. In some cases, this may be implemented only for online use, with a prompt being a single field. In other cases, expedited authentication may be used, in which a user may authenticate with an application without entering a password for the application.

An offline password may be implemented for offline authentication for those managed applications 510 for which offline use is permitted via enterprise policy. For example, an enterprise may want StoreFront to be accessed in this manner In this case, the client agent 504 may require the user to set a custom offline password and the AD password is not used. Gateway server 506 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 510 as secondary credentials (for the purpose of accessing PKI protected web resources via the application management framework micro VPN feature). For example, a managed application 510 may utilize such a certificate. In this case, certificate-based authentication using ActiveSync protocol may be supported, wherein a certificate from the client agent 504 may be retrieved by gateway server 506 and used in a keychain. Each managed application 510 may have one associated client certificate, identified by a label that is defined in gateway server 506.

Gateway server 506 may interact with an enterprise special purpose web service to support the issuance of client certificates to allow relevant managed applications to authenticate to internal PKI protected resources.

The client agent 504 and the application management framework 514 may be enhanced to support obtaining and using client certificates for authentication to internal PKI protected network resources. More than one certificate may be supported, such as to match various levels of security and/or separation requirements. The certificates may be used by the Mail and Browser managed applications 510, and ultimately by arbitrary wrapped applications 510 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 510 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 502 is authenticated to the enterprise, and vice versa. Virtual smart cards for authentication to gateway server 506 may also be implemented.

Both limited and full Kerberos support may be additional features. The full support feature relates to an ability to do full Kerberos login to Active Directory (AD) 522, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 510 is not running.

A multi-site architecture or configuration of enterprise application store and an application controller may be supported that allows users to be serviced from one of several different locations in case of failure.

In some cases, managed applications 510 may be allowed to access a certificate and private key via an API (for example, OpenSSL). Trusted managed applications 510 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Expedited Authentication

Figure 6A:
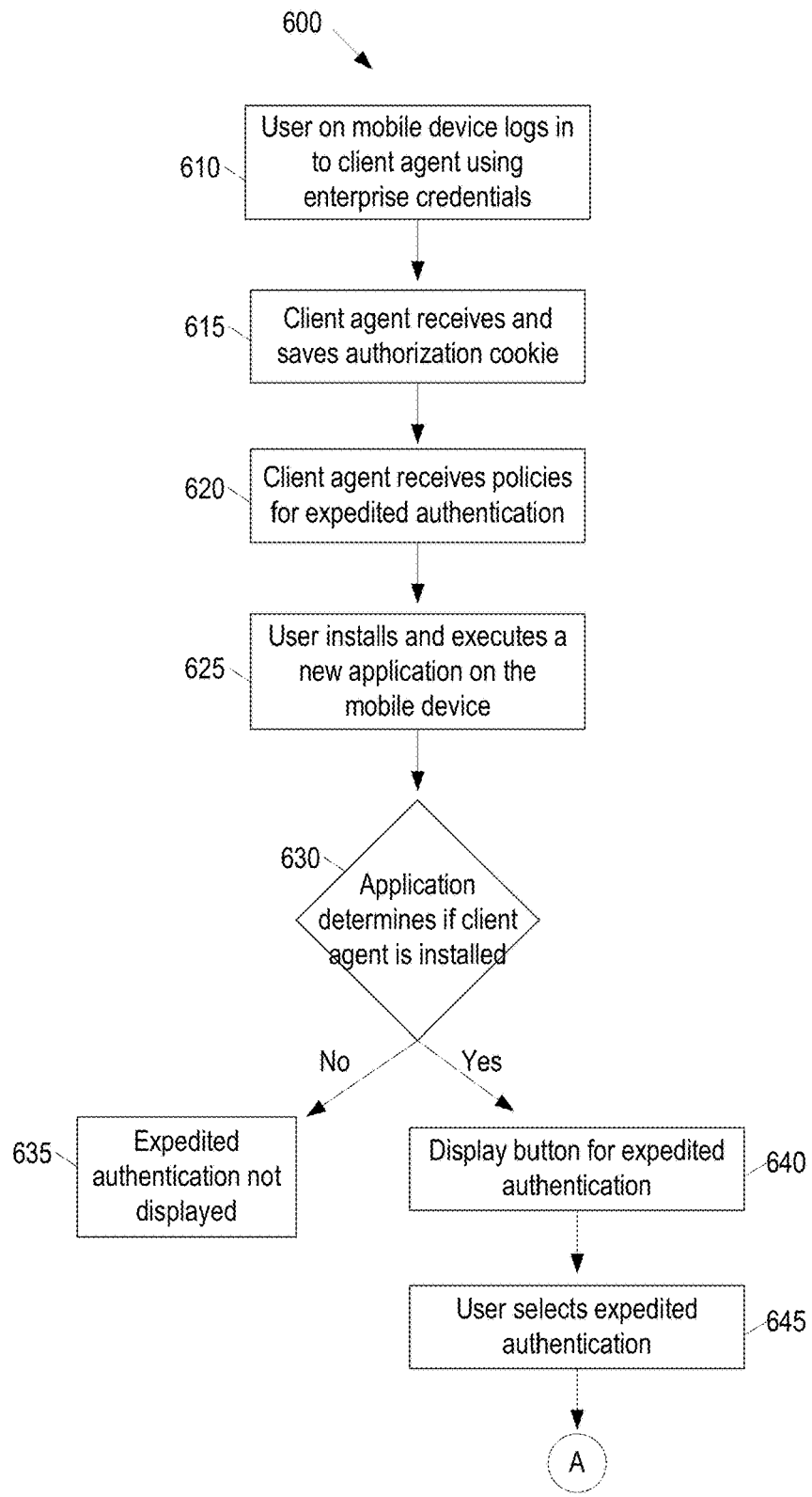
FIGS. 6A and 6B are a flow diagram of a method for expedited authentication according to one or more illustrative aspects of the disclosure.
Figure 6B:
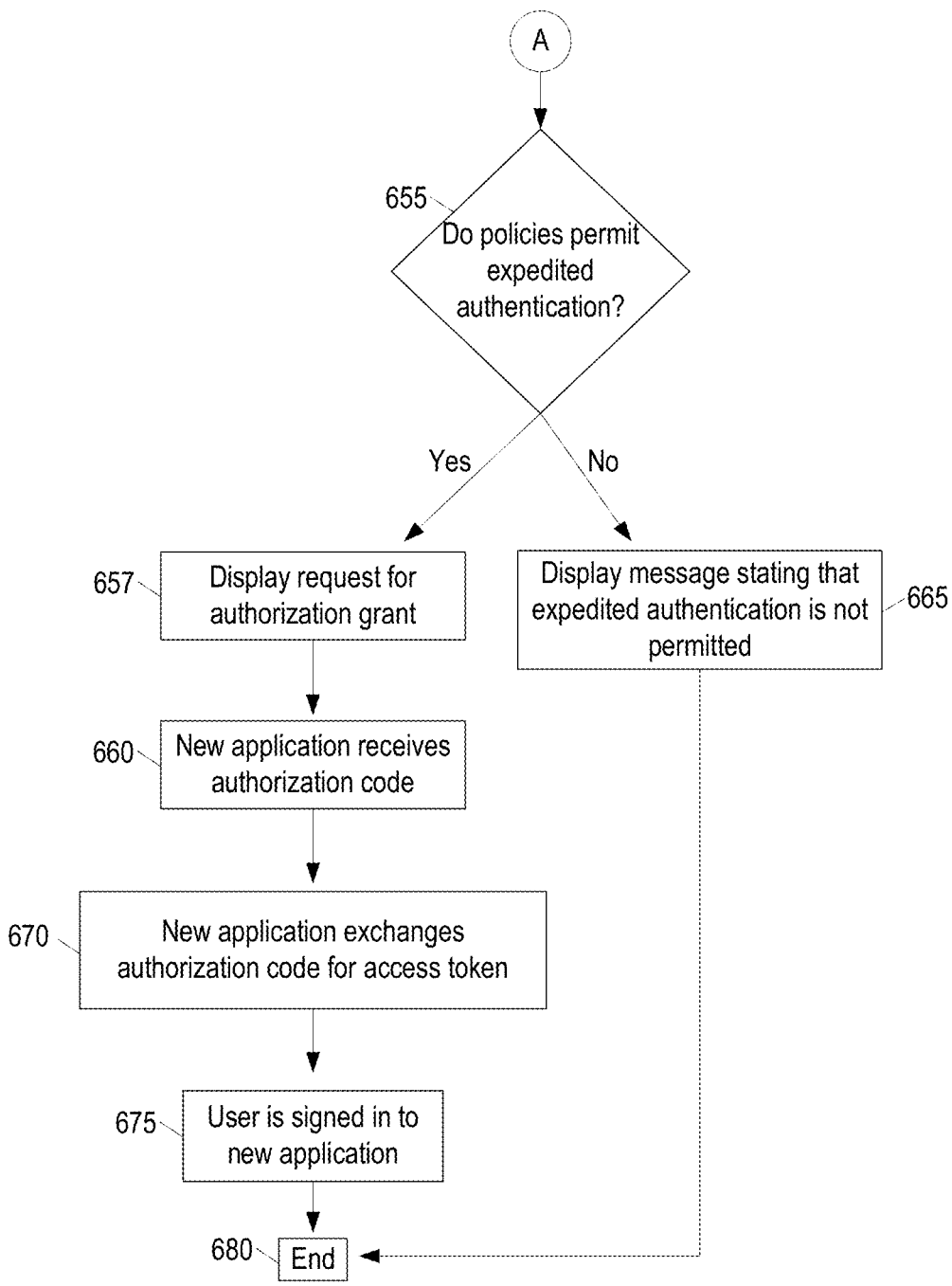

FIGS. 6A and 6B are a flow diagram of a method 600 for expedited authentication according to one or more illustrative aspects of the disclosure. In one or more embodiments, one or more steps illustrated in FIGS. 6A and 6B may be performed by one or more computing devices or entities. For example, portions of the steps illustrated in FIGS. 6A and 6B may be performed by one or more computing devices 201 or by the cloud computing environment 300. The steps illustrated in FIGS. 6A and 6B may be embodied in computer-executable instructions that are stored in a computer-readable medium, such as a non-transitory computer readable medium. The steps illustrated in FIGS. 6A and 6B might not all be performed in the order specified, and some steps may be omitted or changed in order.

At step 610, a user of a mobile device 402 may log in to a client agent 504, which may be referred to as an enterprise agent. The user may log in to the client agent 504 using their enterprise credentials, which may comprise a username and a password. As described above in regards to FIG. 4, a mobile device 402 may be separated into a managed partition 410 and an unmanaged partition 412. When the user logs in at step 610, the user may be granted access to the managed partition 410. For example, the user may be granted access to enterprise applications at step 610. Although step 610 describes a user logging in to a client agent 504, other authentication methods may be used at step 610 for authentication with the client agent 504. For example, certificates corresponding to the client agent 504 may be installed on the mobile device 402.

At step 615, the client agent 504 may receive and save an authorization cookie. The authorization cookie may be received in response to the mobile device logging in to the client agent 504 at step 610. The authorization cookie may correspond to a user of the mobile device 402. The authorization cookie may permit the user of the mobile device 402 to access enterprise resources using the mobile device 402.

At step 620, the client agent 504 may receive policies for expedited authentication. The policies may comprise one or more rules, each applicable to individual applications, groups of applications, or to all applications. The policies may indicate a time period during which applications may be accessed, or a time limit for accessing applications. For example, if a user has been using applications for more than ten hours in one day, the policies may indicate that access to applications should be denied for the remainder of the day. The policies may indicate a geographic area in which access to applications is permitted or denied. For example, access to applications may be denied if the user is attempting to authenticate from outside of the United States. The policies may comprise a list of allowed or denied applications. The policies may indicate a minimum password strength for the mobile device 402. If the password for the mobile device does not meet the minimum password strength indicated in the policies, access to applications may be denied. For example, the policies may comprise one or more rules, such as a minimum password length, corresponding to the minimum password strength for the mobile device.

The policies may be applied to applications that have already been authenticated. A cache corresponding to an authenticated application may be cleared to revoke the authentication. For example, if the policies indicate that no applications are permitted after 5 pm, access to previously authenticated applications may be revoked after 5 pm. The policies may be periodically applied, to ensure that authenticated applications should maintain their authentication. For example, the policies may be applied every twenty minutes. The policies may be applied if a user has changed location. For example, if a user has traveled from one country to another, the policies may be applied to previously authenticated applications to determine whether they should remain authenticated.

After receiving an initial set of policies, the client agent 504 may receive updates to the policies. The client agent 504 may retrieve new policies at a predetermined interval. New policies may be pushed to the client agent 504 when the policies are updated.

At step 625, the user may install and execute a new application on the mobile device 402. The application may request that the user sign in, or authenticate with the application. For example, the user might not be able to use the application until the user has authenticated with the application. The new application may be installed within the managed partition 410 of the mobile device 402. The application may comprise an enterprise application from the enterprise that the user authenticated with at step 610.

Although described as a new application at step 625, the application may have been previously installed. The application may be an application that the user logged out of, or the user's authentication for that application may have timed out. The application may be an application that requests that the user login each time the application is activated.

At step 630, the application executed at step 625 may determine if the client agent 504 is installed. The application may have been configured to interact with an API for expedited authentication. The client agent 504 may expose the API for expedited authentication. The application may be programmed to interact with the API of the client agent 504 for expedited authentication.

If the client agent 504 is not installed, the application may terminate at step 635, or may display an authentication screen that allows a user to sign in to the application without using expedited authentication. The display at step 635 may include a button for expedited authentication, but the button might not be selectable. For example, the button for expedited authentication may be one color, such as light grey, which indicates that it is unavailable for selection, and the selectable buttons may be another color, such as black.

Figure 12:
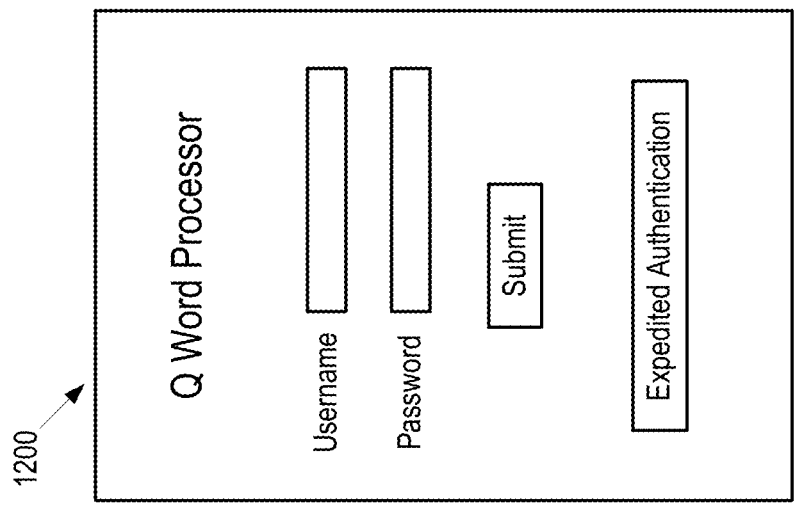
FIG. 12 depicts a user interface of an enterprise application login portal according to one or more illustrative aspects of the disclosure.

If the client agent is determined to be installed at step 630, the application may display a button for expedited authentication at step 640. FIG. 12, described below, illustrates an example of a login screen interface with an expedited authentication button. The expedited authentication button may be selectable by the user. The expedited authentication button may comprise a name or logo of the enterprise. The expedited authentication button may comprise an enterprise email address, username, or name of the user. The expedited authentication button may be generated by the client agent 504, and may be accessed using the API provided by the client agent 504.

At step 645, the user may select the button for expedited authentication. In some instances, the application may automatically attempt to perform expedited authentication, without the user selecting the button. For example, when the application is activated, the application may attempt to perform expedited authentication without any additional user input. In this example, steps 640 and 645 may be skipped.

Figure 7:
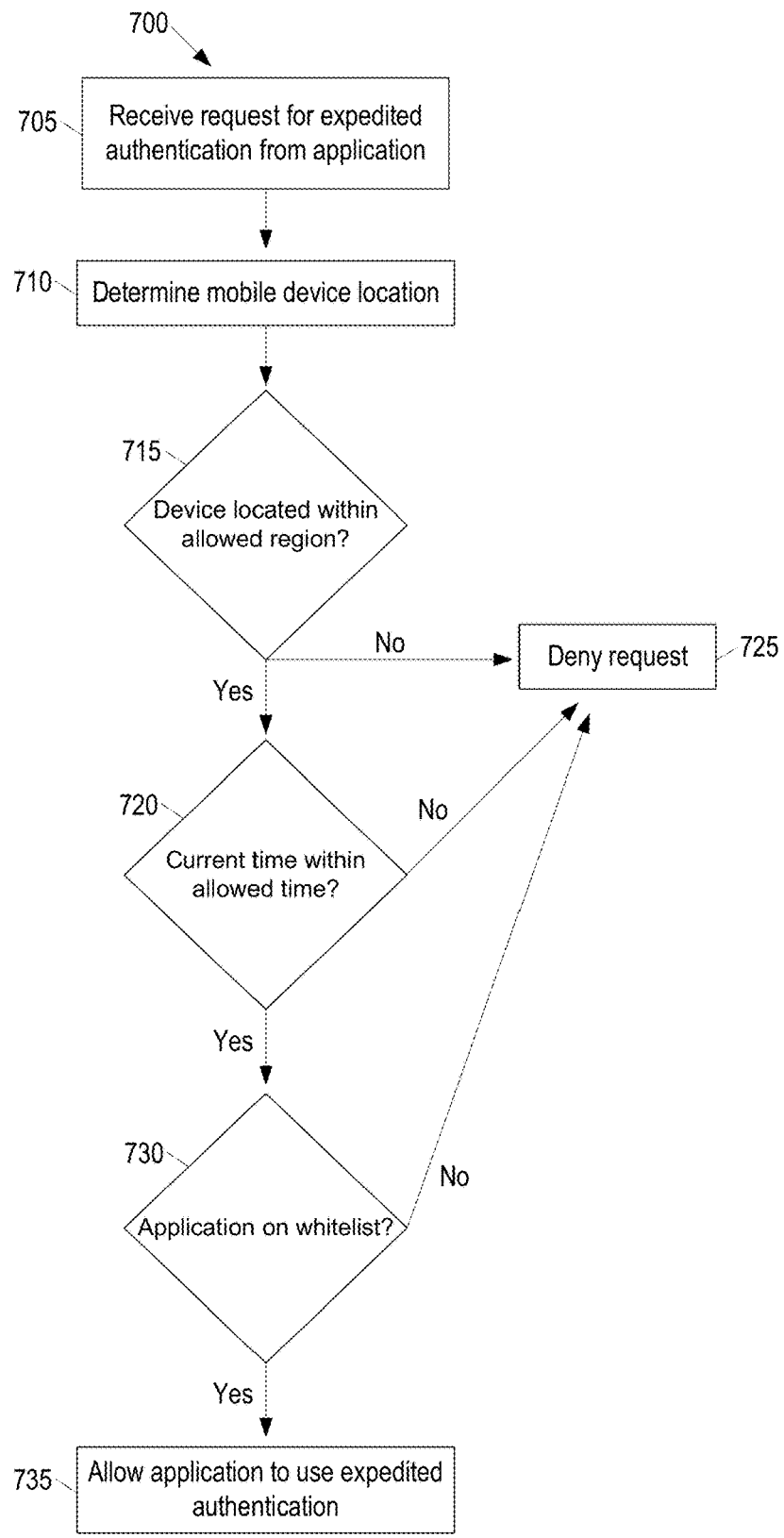
FIG. 7 is a flow diagram of a method for expedited authentication policies according to one or more illustrative aspects of the disclosure.

The method 600 may continue from step 645 of FIG. 6A to step 655 of FIG. 6B. At step 655, the policies received at step 620 may be applied to determine whether the request received at step 645 for expedited authentication is permitted. FIG. 7, described below, illustrates one example of actions that may be performed at step 655. If the policies indicate that expedited authentication is not permitted, a message may be displayed at step 665 indicating that the request for expedited authentication has been denied. The message displayed at step 655 may comprise an explanation of why the request was denied. For example, if access to the application is not permitted after 5 pm, and a request is received at 7 pm, the message may state that access to the application is not permitted after 5 pm.

Figure 13:
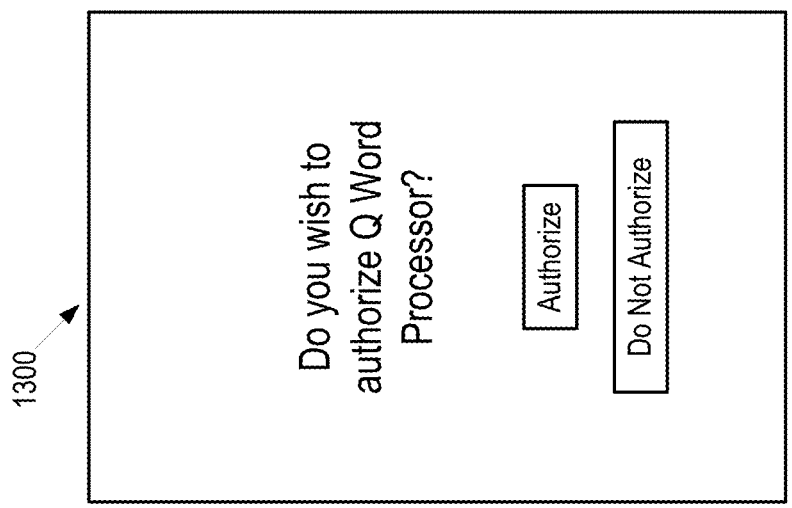
FIG. 13 depicts a user interface for authorizing an application according to one or more illustrative aspects of the disclosure.

If the policies do permit expedited authentication at step 655, an interface requesting that the user confirm that they would like to provide authentication for the application may be displayed at step 657. The interface displayed at step 657 may indicate which data the application will be authorized to access. For example, the interface may indicate that the application, if authorized, will be permitted to access the user's email address and contacts. The interface displayed at step 657 may be displayed by the client agent 504. FIG. 13 illustrates one example of an interface that may be displayed at step 657. Because the interface displayed at 657 is displayed by, or controlled by, the client agent 504, policies may be applied at 655, which may prevent the interface from being displayed at 657, thereby preventing expedited authentication.

When the user authorizes the expedited authentication at step 657, the application may receive an authorization code at step 660. An authentication server may transmit the authorization code at step 660 in response to receiving confirmation from the user, at step 657, that the application should be permitted to authenticate.

At step 670, the application may exchange the authorization code for an access token. The application may exchange the authorization code with the client agent 504, or with an authentication entity related to the client agent 504. For example, the application may transmit the authorization code to the authentication server at step 670. In this example, the application may receive an access token from the authentication server in response to the authorization code. The application may use the expedited authentication API provided by the client agent 504 to perform the exchange at step 670. The user may then be authenticated with the new application at step 675, and may be able to use the application.

At step 675, the application may retrieve and implement application settings corresponding to the authenticated user. For example, the application may retrieve one or more data files corresponding to the user. The application may use the access token to retrieve the application settings. The application may transmit the access token to a resource server, and receive data from the resource server in response to the access token. When authorizing the application, the user may have selected which data the application is permitted to access. For example, the user may have selected that the application is permitted to access the user's email address. The method 600 may then end at step 680.

Using the method 600, a user may authenticate with one or more applications without entering a username, password, or other authentication details. Rather, the user may authenticate with the application using a previous authentication with their enterprise credentials, or with credentials that are provided to or stored with their enterprise account.

FIG. 7 is a flow diagram of a method 700 for expedited authentication policies according to one or more illustrative aspects of the disclosure. In one or more embodiments, one or more steps illustrated in FIG. 7 may be performed by one or more computing devices or entities. For example, portions of the steps illustrated in FIG. 7 may be performed by one or more computing devices 201 or by the cloud computing environment 300. The steps illustrated in FIG. 7 may be embodied in computer-executable instructions that are stored in a computer-readable medium, such as a non-transitory computer readable medium. The steps illustrated in FIG. 7 might not all be performed in the order specified, and some steps may be omitted or changed in order.

At step 705, a request may be received for expedited authentication. The request may be received via an application executing on a mobile device 402. Actions performed at step 705 may be similar to those described above in regards to step 645.

At step 710, a location of the mobile device 402 may be determined. A Global Positioning System (GPS) chip in the mobile device 402 may be used to determine a location of the mobile device 402, a location of the mobile device 402 may be estimated based on communications between the mobile device 402 and one or more radio towers, a location of the mobile device 402 may be determined based on WiFi networks detected by the mobile device 402, or any combination thereof or other method may be used to determine the location of the mobile device 402. The location of the mobile device 402 determined at step 710 may be an estimated location. The location of the mobile device 402 determined at step 710 may be a determination of a time zone and/or country that the mobile device 402 is located in.

At step 715, policies, such as the policies received at step 620, may be applied to determine whether the location determined at step 710 is within an allowed region for expedited authentication. If the location is not within the allowed region, the request for expedited authentication may be denied at step 725.

If the location determined at step 710 is within the allowed region, the method may proceed to step 720. At step 720, a current time may be compared to an allowed time period in the policies. The current time may be a local time of the mobile device 402. The policies may indicate one or more time periods in which expedited authentication is not available. For example, the policies may indicate that the application is not permitted to authenticate between the hours of 10 pm and 5 am. The time periods for the policies may be determined based on local regulations. For example, local regulations might not allow employees to work after 6 pm. In this example, the policies would deny expedited authentication after 6 pm, thereby preventing a user from accessing the application. The policies may indicate one or more maximum amounts of time for accessing the application requesting expedited authentication. For example, the policies may indicate that a user is not permitted to access an application for more than 9 hours per day and/or 40 hours per week. The policies may indicate that a user is not allowed to access the application during a holiday or on the weekends.

If, at step 720, it is determined that the current time is not within an allowed time for expedited authentication, the request for expedited authentication may be denied at step 725. If the current time is within the allowed time for expedited authentication, the method may proceed to step 730.

At step 730, the application requesting expedited authentication may be compared to a whitelist and/or a blacklist. The whitelist may indicate applications that are allowed to perform expedited authentication. If the application is on the whitelist, the application may be permitted to authenticate via expedited authentication at step 735. If the application is not on the whitelist, the request for expedited authentication may be denied at step 725. A package name and/or application signing certificate signature may be compared to the whitelist or blacklist to determine whether the request for expedited authentication should be permitted or denied.

If a blacklist is used at step 730, the application requesting expedited authentication may be compared to the blacklist. If the application is on the blacklist, the request may be denied at step 725. If the application is not on the blacklist, the request may be approved and the application may authenticate at step 735. At step 735, the application may be provided with an authorization code, which may be used to authenticate the application with the client agent 504, or a backend associated with the client agent 504.

Figure 8:
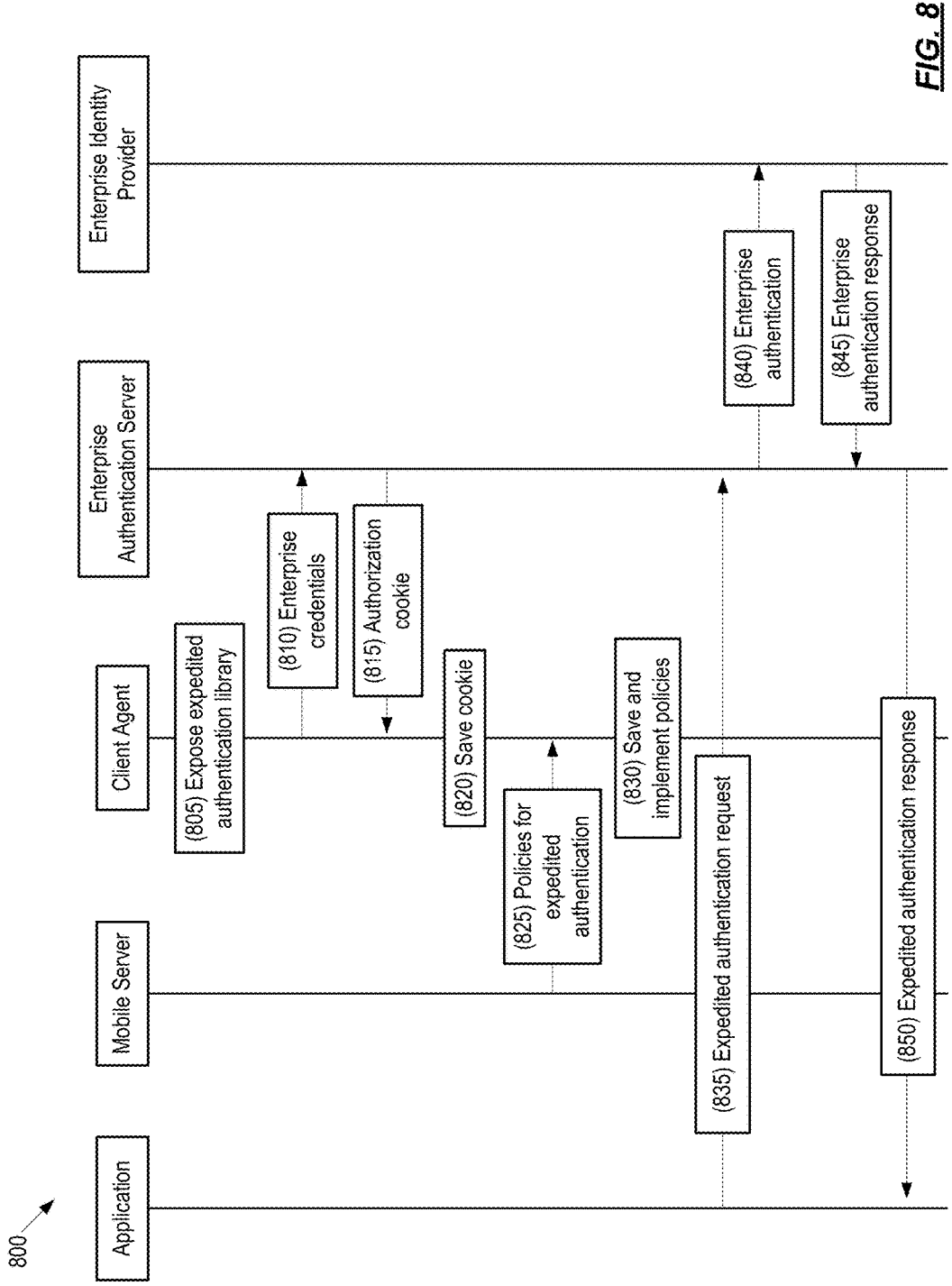
FIG. 8 is a diagram illustrating expedited authentication according to one or more illustrative aspects of the disclosure.

FIG. 8 is a diagram 800 illustrating expedited authentication according to one or more illustrative aspects of the disclosure. The steps illustrated in FIG. 8 might not all be performed in the order specified, and some steps may be omitted or changed in order.

At step 805, a client agent may expose an expedited authentication library. The exposed library may comprise an API accessible by applications. The exposed library may allow applications to provide expedited authentication. The client agent may be installed and executed on the mobile device 402.

At step 810, enterprise credentials may be transmitted from the client agent to an enterprise authentication server. The enterprise credentials may be transmitted in an encrypted format. The enterprise credentials may have been input by a user. The enterprise authentication server may validate the enterprise credentials.

At step 815, an authorization cookie may be received at the client agent. The enterprise authentication server may transmit the authorization cookie to the client agent in response to receiving the enterprise credentials. At step 820, the client agent may store the authorization cookie. For example, the client agent may store the authorization cookie in a "cookie jar" where one or more cookies are stored. The authorization cookie may permit the mobile device 402 to access enterprise applications and/or enterprise services, such as via a managed partition of the mobile device 402. For example, the authorization cookie may permit the mobile device 402 to access an enterprise email account.

At step 825, the client agent may receive policies for expedited authentication. As described above, the policies may comprise one or more rules for expedited authentication. The policies may be transmitted from a mobile server. At step 830, the client agent may save and implement the policies received at step 825.

At step 835, an application may transmit an expedited authentication request to the enterprise authentication server. The expedited authentication request may be transmitted in response to a user selection of expedited authentication. The expedited authentication request may be transmitted in response to a user initializing the application. The expedited authentication request may be transmitted via an API provided by the client agent. The client agent may display an authorization grant display, which may allow the user to select whether or not to provide authentication to the application through the enterprise.

At step 840, the enterprise authentication server may perform an enterprise authentication with an enterprise identity provider and receive an enterprise authentication response at step 845 from the enterprise identity provider. The enterprise authentication server may then transmit an expedited authentication response to the application at step 850. The expedited authentication response may comprise an authorization code, which allows the application to be authenticated with the client agent. The application may exchange the authorization code for an access token. A user of the mobile device 402 may then access the application.

Figure 9:
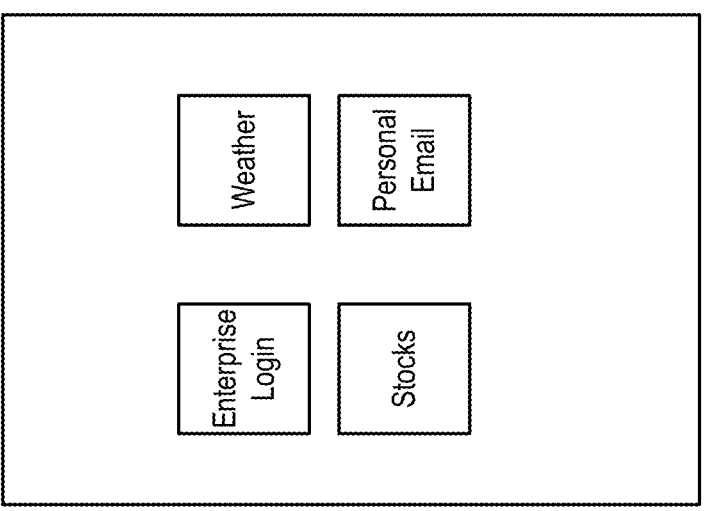
FIG. 9 depicts a user interface of an application launcher according to one or more illustrative aspects of the disclosure.

FIG. 9 depicts a user interface 900 of an application launcher according to one or more illustrative aspects of the disclosure. The user interface 900 may comprise an application launcher interface for the unmanaged partition 412 of the mobile device 402. A user may select any of the applications in the interface 900 to activate that application. If the user selects the "Enterprise Login" application, the interface 1000, described below, may be displayed.

Figure 10:
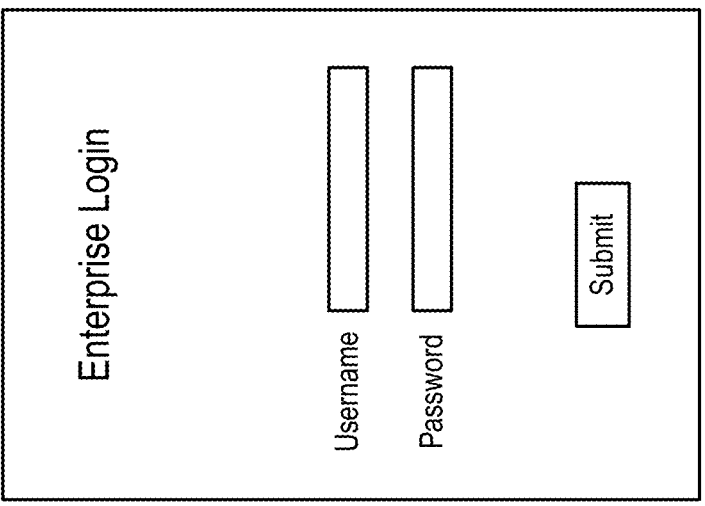
FIG. 10 depicts a user interface of a login portal according to one or more illustrative aspects of the disclosure.

FIG. 10 depicts a user interface 1000 of a login portal according to one or more illustrative aspects of the disclosure. The user interface 1000 may comprise an area for entering a username, a password, and/or any other authentication credentials. A user may enter their credentials, using the user interface 1000, to authenticate with a client agent 504.

Figure 11:
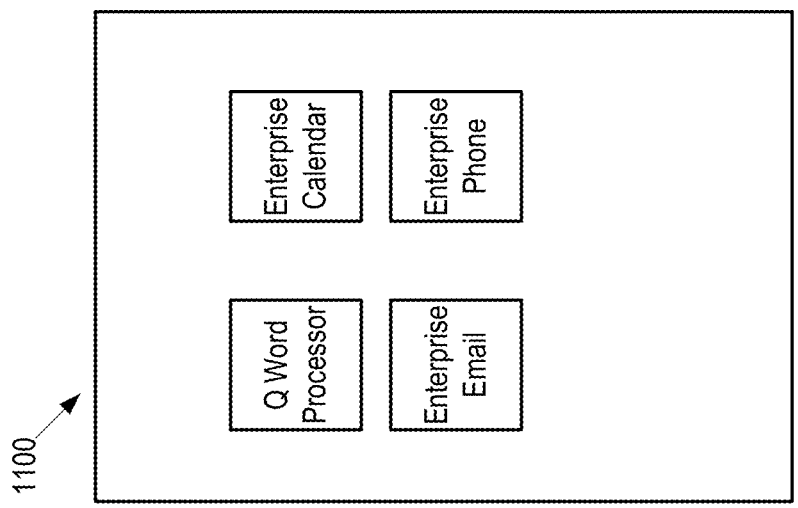
FIG. 11 depicts a user interface of a secure application launcher according to one or more illustrative aspects of the disclosure.

FIG. 11 depicts a user interface 1100 of a secure application launcher according to one or more illustrative aspects of the disclosure. When a user has authenticated with the client agent 504, for example by using the user interface 1000, the user interface 1100 may be displayed. The user interface 1100 may comprise an application launcher for the managed partition 410 of the mobile device 402. A user may select an application on the interface 1100 to execute that application. The applications displayed on the user interface 1100 may comprise applications that have been authorized by an enterprise. An application launcher may provide both secure and unsecure applications. For example, the icons in the user interface 1100 may be displayed with the icons in the user interface 900.

FIG. 12 depicts a user interface 1200 of an enterprise application login portal according to one or more illustrative aspects of the disclosure. For example, if a user selected the "Q Word Processor" icon on the user interface 1100, the user interface 1200 may be displayed. The user interface 1200 may comprise an area for entering a username, a password, and/or any other authentication credentials. If supported by the application, the user interface 1200 may comprise a selection for expedited authentication. When a user selects expedited authentication, the user might not be asked for a username, password, or other authentication credentials.

FIG. 13 depicts a user interface 1300 for authorizing an application according to one or more illustrative aspects of the disclosure. The user interface 1300 may be displayed by the client agent 504, which may be executing in the managed partition 410. The user interface 1300 may display an indicator of an entity associated with the authentication, such as an enterprise. The enterprise may operate an authentication server that provides an authorization code to the application requesting expedited authentication, if the authentication is successful. For example, if the user is employed at a corporation, the display 1300 may comprise an indicator of the corporation, such as a logo or name of the corporation. The user interface 1300 may be displayed if the request for expedited authentication satisfies policies implemented by the enterprise.

The user interface 1300 may indicate which data will be shared with the application, if the application is authorized by the user. For example, the user interface 1300 may indicate that the application will be authorized to access the user's email address, contacts, location, stored photographs, or other data. The user interface 1300 may allow the user to select which data, or which categories of data, are shared with the application. For example, the user may authorize the application to access the user's email address, but deny the application access to the user's contacts and location.

Figure 14:
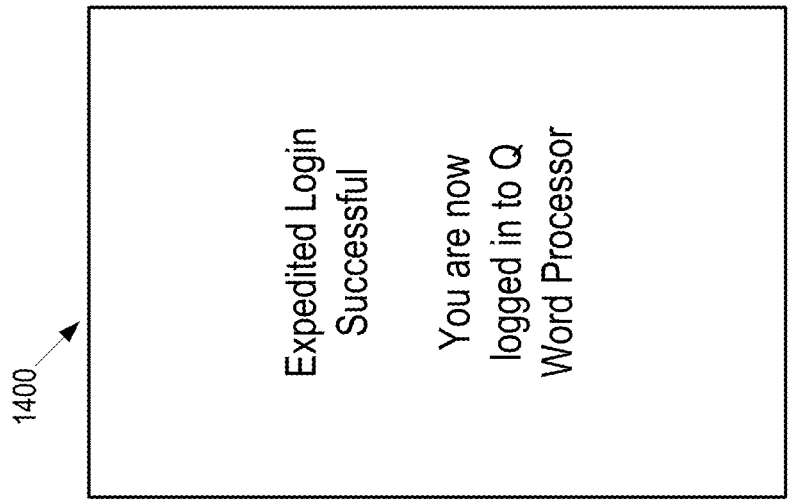
FIG. 14 depicts a user interface of a successful expedited authentication according to one or more illustrative aspects of the disclosure.

FIG. 14 depicts a user interface 1400 of a successful expedited authentication according to one or more illustrative aspects of the disclosure. For example, when a user selects expedited authentication on the user interface 1200, and the user authorizes the expedited authentication on the user interface 1300, the user interface 1400 may be displayed. The user interface 1400 may indicate that expedited authentication was successful, and that the user now has access to the application that requested expedited authentication.

Figure 15:
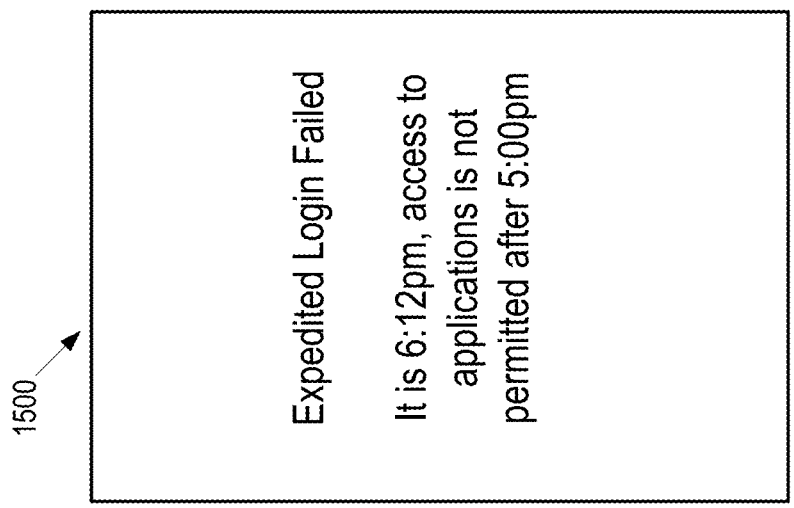
FIG. 15 depicts a user interface of an expedited authentication failure according to one or more illustrative aspects of the disclosure.

FIG. 15 depicts a user interface 1500 of an expedited authentication failure according to one or more illustrative aspects of the disclosure. For example, when a user selects expedited authentication on the user interface 1200, the user interface 1400 might be displayed. As described above, policies may be implemented to restrict expedited authentication. The user interface 1500 may comprise a description of which policy caused the expedited authentication request to be denied.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving authentication credentials for a client agent, wherein the authentication credentials correspond to a user;
transmitting, based on the authentication credentials, an authentication request;
receiving, in response to the authentication request, one or more rules for expedited authentication;
receiving a request to activate a managed mobile device application, the application being executable within a secure partition of a mobile device;
determining that an expedited authentication application programming interface (API) is available at the client agent;
displaying, in response to determining that the expedited authentication API is available, a selectable element corresponding to expedited authentication;
receiving, via the selectable element, a request for expedited authentication;
determining, based on the one or more rules, to provide expedited authentication to the mobile device application;
receiving an authorization code;
exchanging the authorization code for an access token; and
authorizing, based on the access token, the user to access the mobile device application.

2. The method of claim 1, wherein determining to provide expedited authentication comprises comparing a current time to permitted times, in the one or more rules, for accessing the application.

3. The method of claim 1, wherein determining to provide expedited authentication comprises comparing a current location of the user to permitted locations, in the one or more rules, for accessing the application.

4. The method of claim 1, wherein the rules indicate one or more time periods in which the user is permitted to access the mobile device application.

5. The method of claim 1, wherein the rules indicate one or more geographic areas in which the user is permitted to access the mobile device application.

6. The method of claim 1, further comprising downloading, via the client agent, the mobile device application.

7. A method comprising:
receiving authentication credentials for a client agent, wherein the authentication credentials correspond to a user;
transmitting, based on the authentication credentials, an authentication request;
receiving, in response to the authentication request, one or more rules for expedited authentication;
receiving a request for expedited authentication, wherein the request corresponds to a managed application executable within a secure partition of a mobile device;

determining, based on the one or more rules, to provide expedited authentication to the application; and providing, to the application, an access token authenticating the user with the application.

8. The method of claim 7, further comprising:

transmitting, by the application an authorization cookie; and receiving, by the application and in response to the authorization cookie, the access token.

9. The method of claim 7, wherein determining to provide expedited authentication to the application comprises comparing a current time to permitted times, in the one or more rules, for accessing the application.

10. The method of claim 7, wherein determining to provide expedited authentication to the application comprises comparing a current location of the user to permitted locations, in the one or more rules, for accessing the application.

11. The method of claim 7, wherein the client agent comprises an application programming interface (API) for expedited authentication.

12. The method of claim 11, wherein the application communicates with the client agent via the API for expedited authentication.

13. A method comprising:

receiving a request to activate a mobile device application configured to access data within a secure partition of a mobile device;

determining, by the mobile device application, that an expedited authentication application programming interface (API) is available at a client agent;

displaying, in response to determining that the expedited authentication API is available, a selectable element corresponding to expedited authentication;

receiving a selection of the selectable element;

in response to the selection, requesting, via the expedited authentication API, authentication for the application;

receiving an authorization code;

exchanging the authorization code for an access token; and authorizing, based on the access token, a user to access the mobile device application.

14. The method of claim 13, wherein the mobile device application is configured to interact with the expedited authentication API.

15. The method of claim 13, wherein exchanging the authorization code comprises exchanging, via the expedited authentication API, the authorization code.

16. The method of claim 13, wherein authorizing the user to access the mobile device application comprises implementing application settings corresponding to the user.

17. The method of claim 13, wherein the client agent provides the mobile device application access to the secure partition.

* * * * *